United States Patent
Cili et al.

(10) Patent No.: US 11,656,664 B2
(45) Date of Patent: May 23, 2023

(54) CONTEXT AWARE THERMAL PRESSURE PREDICTION AND REACTION

(71) Applicant: Apple Inc., Cupertino, CA (US)

(72) Inventors: Gencer Cili, Oakville (CA); Zhen Liu, San Jose, CA (US); Mahak Goindani, Cupertino, CA (US); Sairam T. Gutta, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 16/894,563

(22) Filed: Jun. 5, 2020

(65) Prior Publication Data

US 2021/0382534 A1    Dec. 9, 2021

(51) Int. Cl.
*G06F 1/20* (2006.01)
*H04W 52/00* (2009.01)
*G06N 20/00* (2019.01)
*H04W 88/06* (2009.01)

(52) U.S. Cl.
CPC ............ *G06F 1/206* (2013.01); *G06N 20/00* (2019.01); *H04W 52/00* (2013.01); *H04W 88/06* (2013.01)

(58) Field of Classification Search
CPC ....... G06F 1/206; G06N 20/00; H04W 52/00; H04W 88/06
See application file for complete search history.

(56) References Cited

U.S. PATENT DOCUMENTS

| | | | |
|---|---|---|---|
| 9,557,786 B2 | 1/2017 | Wang et al. | |
| 9,977,439 B2 | 5/2018 | Park et al. | |
| 10,555,436 B1 | 2/2020 | Kalyanasundaram et al. | |
| 2010/0094582 A1* | 4/2010 | Cox | G01K 7/425 702/130 |
| 2012/0311357 A1* | 12/2012 | Andrews | G06F 1/3203 713/320 |
| 2015/0067153 A1* | 3/2015 | Bhattacharyya | H04L 43/04 709/224 |
| 2015/0113303 A1 | 4/2015 | Jung | |
| 2015/0347330 A1* | 12/2015 | Vaishampayan | G06F 13/102 710/60 |
| 2016/0139589 A1 | 5/2016 | Chandra et al. | |

(Continued)

OTHER PUBLICATIONS

Francesco Paterna et al.; "Modeling and Mitigation of Extra-SoC Thermal Coupling Effects and Heat Transfer Variations in Mobile Devices"; 2015 IEEE/ACM International Conference on Computer-Aided Design (ICCAD). ICCAD 15: IEEE/ACM International Conference on Computer-Aided Design•AustinTXUSA•Nov. 2015; 8 pages; http://seelab.ucsd.edu/papers/Paterna_ICCAD15.pdf.

(Continued)

*Primary Examiner* — Yuwen Pan
*Assistant Examiner* — Angelica Perez
(74) *Attorney, Agent, or Firm* — Kowert, Hood, Munyon, Rankin & Goetzel, P.C.

(57) ABSTRACT

This disclosure relates to techniques for a wireless device to predict and mitigate thermal pressure. Status information for multiple parameters for the wireless device may be received. A predicted thermal status for the wireless device may be determined based at least in part on the status information for the multiple parameters for the wireless device. The wireless device may determine whether to perform thermal mitigation action based at least in part on the predicted thermal status for the wireless device.

20 Claims, 10 Drawing Sheets

(56) References Cited

U.S. PATENT DOCUMENTS

2016/0357232 A1\* 12/2016 Kalyanasundaram ........................ G06F 1/3296
2019/0114212 A1    4/2019 Gwin
2019/0317576 A1\* 10/2019 North .................... G06F 1/1616
2021/0135963 A1\*  5/2021 Yang ..................... H04L 43/065
2021/0232190 A1\*  7/2021 Zhu ....................... G06F 1/3287

OTHER PUBLICATIONS

Singla, Gaurav, et al.; "Predictive Dynamic Thermal and Power Management for Heterogeneous Mobile Platforms", 2015 Design. Automation & Test in Europe Conference & Exhibition; Grenoble France•Mar. 2015; 53 pages. https://repository.asu.edu/attachments/150490/content/singla_asu_0010N_14726.pdf.

\* cited by examiner

| Low thermal stress, high confidence 1202 ||
|---|---|
| Feature name: | Feature value |
| deviceScreenOn: | TRUE |
| batteryIsCharging: | FALSE |
| batteryExternalPowerIsConnected: | FALSE |
| devicePluggedIn: | FALSE |
| activityDepth: | 1 |
| activityDomain: | Web |
| cellularBandInfo: | Null |
| cellularLQM: | 100 |

| Low thermal stress, mid confidence 1204 ||
|---|---|
| Feature name: | Feature value |
| deviceScreenOn: | TRUE |
| batteryIsCharging: | TRUE |
| batteryExternalPowerIsConnected: | TRUE |
| devicePluggedIn: | TRUE |
| activityDepth: | 1 |
| activityDomain: | Web |
| cellularBandInfo: | 12 |
| cellularLQM: | 100 |

| High thermal stress, high confidence 1206 ||
|---|---|
| Feature name: | Feature value |
| deviceScreenOn: | TRUE |
| batteryIsCharging: | FALSE |
| batteryExternalPowerIsConnected: | FALSE |
| devicePluggedIn: | FALSE |
| activityDepth: | 5 |
| activityDomain: | Media |
| cellularBandInfo: | 41 |
| cellularLQM: | 100 |

FIG. 12

CONTEXT AWARE THERMAL PRESSURE PREDICTION AND REACTION

FIELD

The present application relates to wireless communications, and more particularly to systems, apparatuses, and methods for predicting and mitigating thermal pressure in a wireless device.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Further, many device components can have temperature sensitivities, for example such that damage to those components could occur in certain thermal conditions. Thus, it is important to reduce power requirements and avoid potential damage from thermal conditions in UE device designs while allowing the UE device to maintain good transmit and receive abilities for improved communications. Accordingly, improvements in the field are desired.

SUMMARY

Embodiments are presented herein of apparatuses, systems, and methods for predicting and mitigating thermal pressure in a wireless device.

According to the techniques described herein, a wireless device may gather status information for a variety of parameters for the wireless device, and use that information to predict whether the temperature of the wireless device will exceed a desired threshold, e.g., within a certain amount of time and absent taking mitigation action. The wireless device may use a machine learning model to perform the thermal status prediction for the wireless device. The machine learning model may be trained using aggregated (e.g., crowd-sourced) data from multiple wireless devices, and may further be refined by the wireless device using wireless device specific data, at least according to some embodiments.

Based on such predictions, the wireless device may determine whether to take preventative thermal mitigation action, and if so, which thermal mitigation action or actions to take. Such an approach to managing the temperature of the wireless device may reduce the amount of time spent by the wireless device at undesired operating temperatures, as at least some such instances may be avoided by taking preventative thermal mitigation action when the device is predicted to be at high risk of exceeding the desired temperature threshold but has not actually exceeded the desired temperature threshold.

Additionally, such an approach may facilitate a targeted approach to determining which thermal mitigation actions to take, e.g., in order to increase the effectiveness of those thermal mitigation actions. For example, when high thermal risk is predicted, it may be possible to determine which subsystems or activities are most responsible for the high thermal risk, and to select thermal mitigation actions to take that target those subsystems or activities in a context aware manner.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 12 illustrates examples of various possible thermal status prediction results and confidence levels for various possible sets of input parameter values, according to some embodiments.

Figure 1:
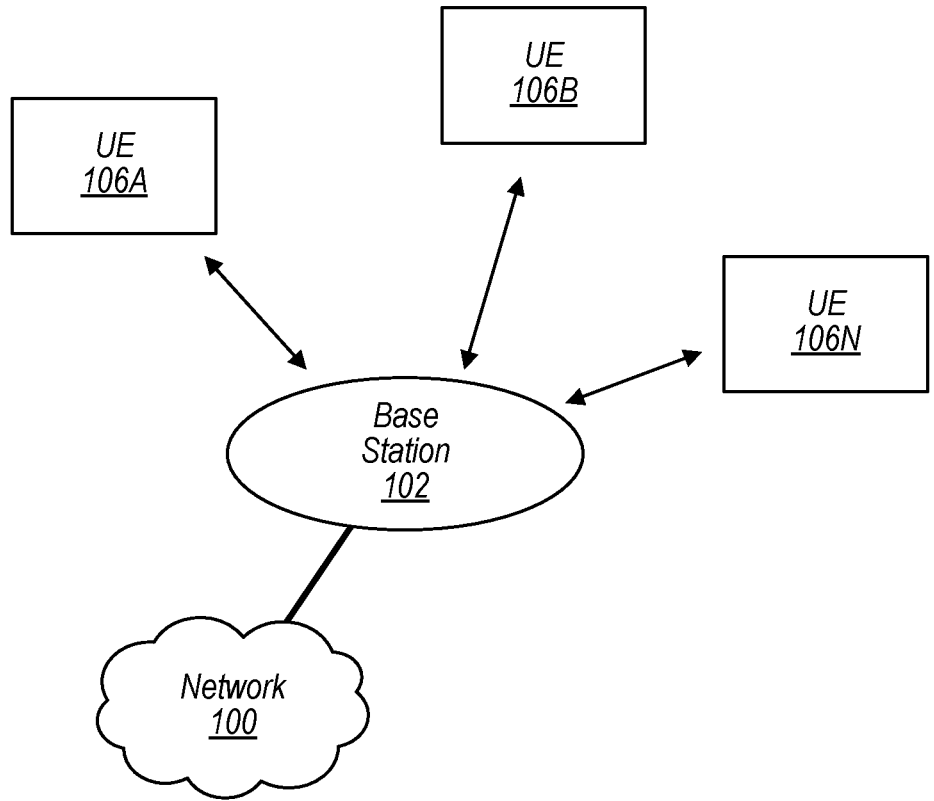
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
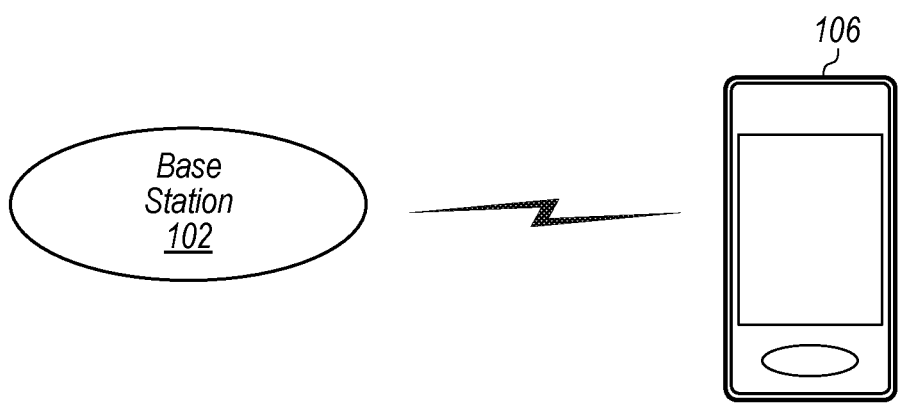
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to predict and mitigate thermal pressure in a wireless device, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
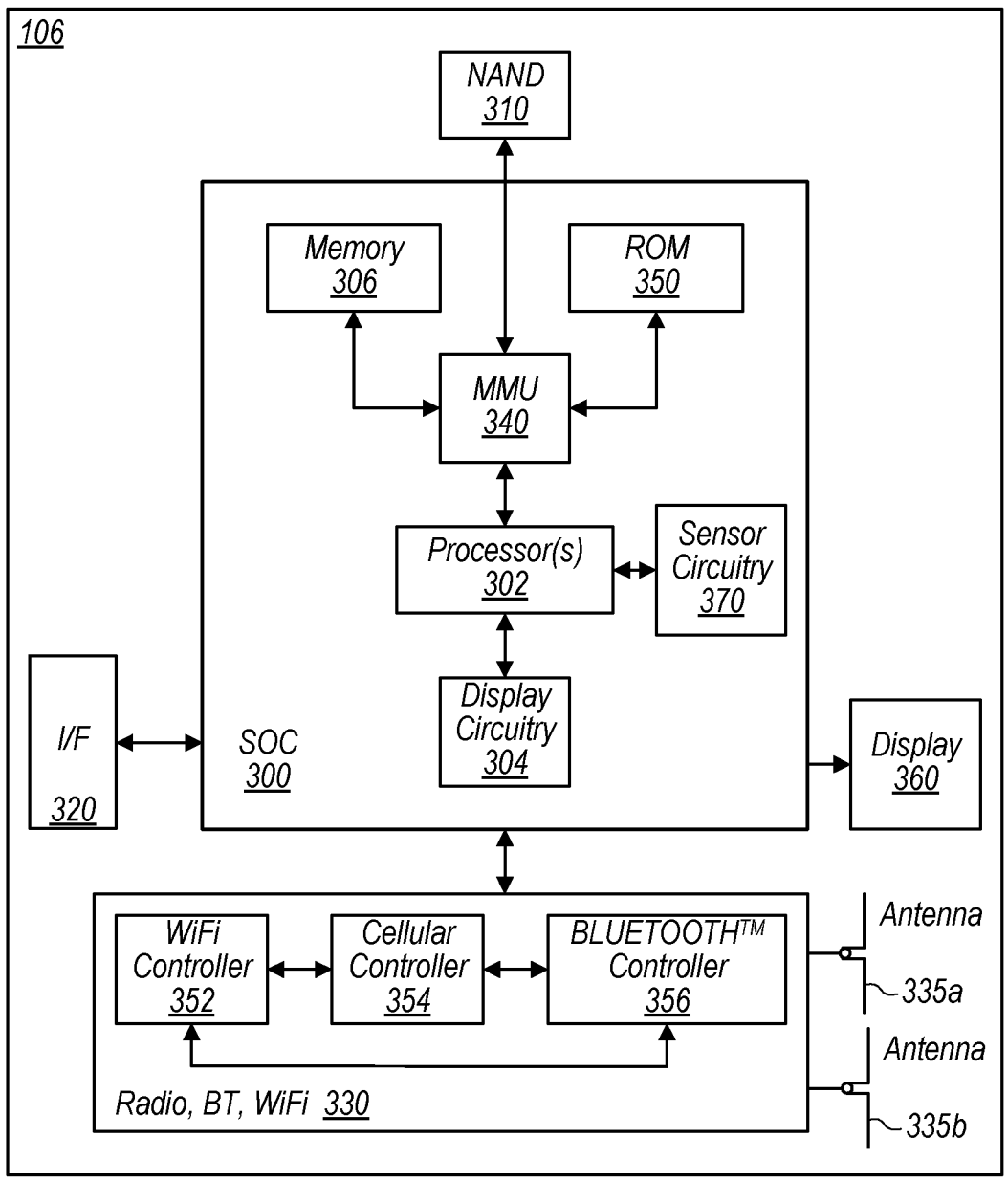
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH', Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to predict and mitigate thermal pressure in a wireless device, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to predict and mitigate thermal pressure in a wireless device according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or

Figure 4:
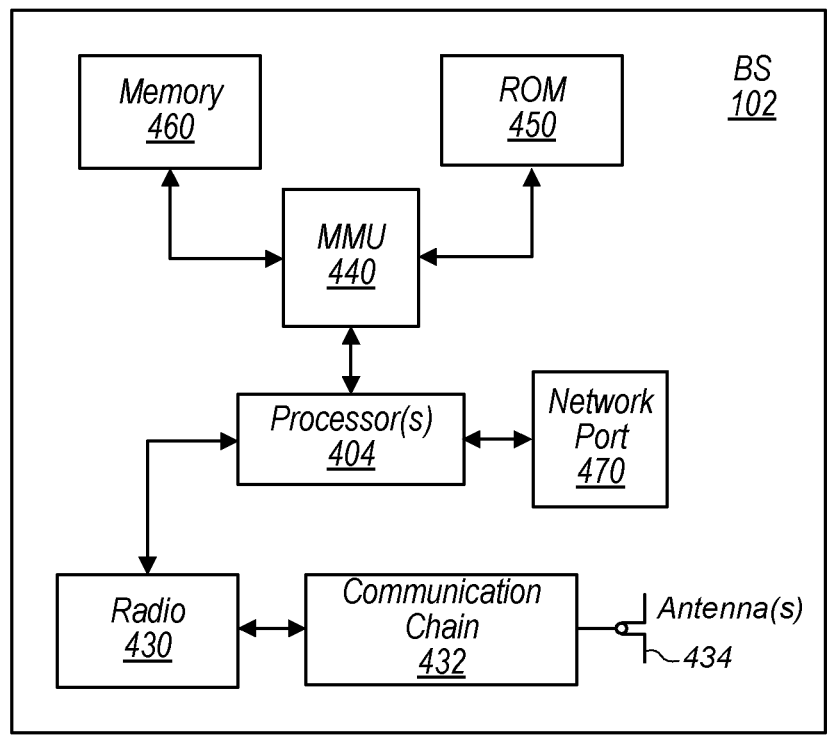
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
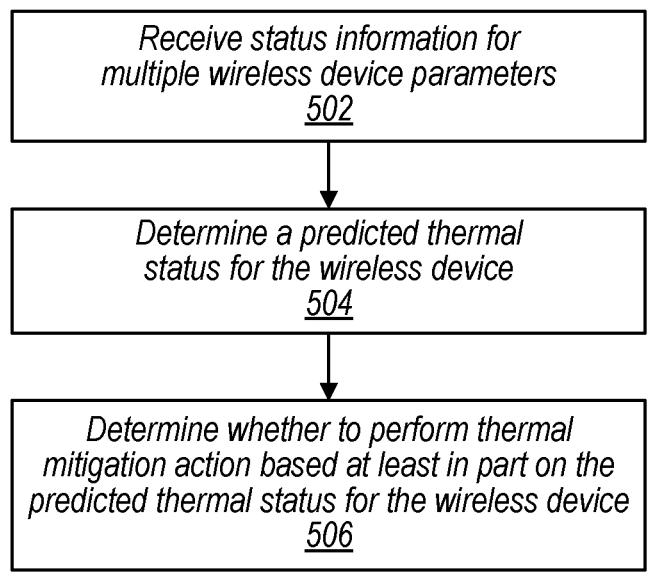
FIG. 5 is a flowchart diagram illustrating aspects of an exemplary possible method for predicting and mitigating thermal pressure in a wireless device, according to some embodiments.

FIG. 5—Predicting and Mitigating Thermal Pressure in a Wireless Device

At least in some instances, it may be important to manage the operating temperature of a wireless device. For example, it may be the case that certain components of a wireless device could potentially act unpredictably, cease to function, and/or suffer damage when operated outside of a specified temperature range. As another example, some devices may be designed for use in contact with the skin of their user (e.g., smart watch, smart glasses, other wearable devices, etc.), in which case it may be desirable to maintain an operating temperature that is within user comfort range, e.g., to improve user experience.

One possible approach to managing the operating temperature of a wireless device may include a passive approach, e.g., in which the wireless device monitors the temperature of the wireless device to detect when the temperature extends beyond any desired limits, and to take a reactive approach to performing thermal mitigation in response to detecting such a scenario.

Another possible approach to managing the operating temperature of a wireless device may include a proactive approach, e.g., in which the wireless can potentially predict when thermal pressure is likely to occur, and to proactively take thermal mitigation action to potentially avoid the device operating temperature from reaching undesirable levels.

It may be the case that taking such a proactive approach can result in at least some instances when the operating temperature of a wireless device would otherwise reach an undesirable level being avoided. Further, at least in some instances, such an approach can support more gradual and/or targeted thermal mitigation actions when abnormal thermal pressure is predicted, e.g., based on the features of the wireless device that may be responsible for the abnormal thermal pressure. This can in turn result in potential power consumption reduction, user experience improvements, and/or other benefits, at least in some scenarios. Note that such an approach may be used to supplement a passive thermal detection and mitigation approach, or may be used as an alternative approach, according to various embodiments.

FIG. 5 is a flowchart diagram illustrating such a method for predicting and mitigating thermal pressure in a wireless device, at least according to some embodiments. Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may receive status information for multiple parameters for the wireless device. The status information may include parameter values and/or any of various other status information for any of various parameters for the wireless device. At least according to some embodiments, the status information may include parameter values for a set of parameters or features that each provide at least some information gain for predicting the thermal status of the wireless device.

As some examples, in some instances, the status information may include information related to any of various possible network activity status parameters, such as a type of application currently performing network activity or otherwise active at the wireless device, a reason for network activity completion for a network activity of the wireless device, whether transmission control protocol (TCP) fast open or any of various other networking layer protocols are configured and/or in use, etc. In some instances, the status information may include information related to any of various possible battery status parameters, such as whether a battery of the wireless device is connected to an external power source, whether the battery of the wireless device is currently charging, a battery capacity of the wireless device, etc. In some instances, the status information may include information related to any of various possible wireless communication status parameters, such as a cellular carrier or network currently used to perform cellular communication by the wireless device, a cellular radio access technology in use by the wireless device, cellular link quality for a cellular link in use by the wireless device, a cellular band in use by the wireless device, a cellular bandwidth in use by the wireless device, a Wi-Fi technology in use by the wireless device, a Wi-Fi band in use by the wireless device, a Wi-Fi link quality metric for a Wi-Fi link in use by the wireless device, a GPS band in use by the wireless device, etc. Additionally, in some instances, the status information may include information related to any of various other types of parameters, such as a device type of the wireless device, how many subscriber identity modules (SIMS) the wireless device has, whether a screen of the wireless device is currently on, a screen brightness level for the wireless device, a processor utilization level of the wireless device, an ambient temperature for the wireless device (e.g., the temperature in the vicinity or surroundings of the wireless device), a motion state of the wireless device, etc.

In 504, the wireless device may determine a predicted thermal status (e.g., determine a thermal pressure level) for the wireless device, e.g., based at least in part on the status information for the multiple parameters for the wireless device. This may include using a thermal status prediction algorithm (which may alternatively be referred to herein as a thermal pressure classification algorithm), such as a decision tree classifier algorithm, support vector machine, neural network, or any of various other possible classifier algorithms, to predict the thermal status of the wireless device, at least according to some embodiments. The thermal status prediction algorithm may be a machine learning classification algorithm, at least according to some embodiments.

For example, in some instances, the thermal status prediction algorithm may be based at least in part on a machine learning classification model trained using crowd-sourced data from the wireless device and/or other wireless devices. The wireless device may receive the machine learning classification model information for the thermal status prediction algorithm from another device, such as a cloud server (e.g., among various other possibilities). The crowd-sourced data could include information regarding parameter values, thermal status predictions, and/or associated thermal status outcomes for the wireless device and/or other wireless devices, among various possible types of data.

In some instances, the wireless device may additionally or alternatively perform training for the thermal status prediction algorithm, e.g., using data samples from the wireless device. For example, the wireless device may refine the machine learning classification model received from the cloud server by further training its thermal status prediction algorithm using previous data samples for parameter values, thermal status predictions, and/or associated thermal status outcomes for the wireless device. As another possibility, the wireless device may perform all of the training for its thermal status prediction algorithm, e.g., using only data samples from the wireless device, or using data samples from the wireless device as well as other wireless devices.

According to various embodiments, the thermal status prediction algorithm may be a binary classifier or a multi-class prediction algorithm. For example, as one possibility, the thermal status prediction algorithm perform binary classification to classify the thermal pressure of the wireless device as normal thermal pressure (e.g., if device operating temperature is predicted to not extend beyond a desired operating range within a specified amount of time) or abnormal thermal pressure (e.g., if device operating temperature is predicted to extend beyond the desired operating range within the specified amount of time, absent thermal mitigation action). In some instances, a confidence level for the thermal pressure classification may also be determined if the thermal pressure classification algorithm is such a binary classification algorithm. As another possibility, the thermal pressure classification algorithm may classify whether the thermal pressure of the wireless device is light thermal pressure, moderate thermal pressure, heavy thermal pressure, and/or any of various other possible thermal pressure classes.

In 506, the wireless device may determine whether to perform thermal mitigation action based at least in part on the predicted thermal status (e.g., thermal pressure classification) for the wireless device. For example, as one possibility, the wireless device may determine to perform one or more thermal mitigation actions when the thermal status prediction is abnormal thermal pressure, and may determine to not perform any thermal mitigation actions when the thermal status prediction is normal thermal pressure.

In some instances, the decision whether to perform thermal mitigation action, and/or the decision of which thermal mitigation action(s) to take, may further be based at least in part on the confidence level for the thermal status prediction. For example, in some instances, the wireless device may determine to not perform any thermal mitigation actions even when the thermal status prediction is abnormal thermal pressure if the confidence level for the thermal status prediction is below a certain threshold. As another example, in some instances, the wireless device may select more and/or stronger thermal mitigation actions to take in response to the thermal status prediction if the thermal status prediction is abnormal thermal pressure and if the confidence level for the thermal status prediction is below a certain threshold. Various such thresholds could be configured, for example such that the wireless device may determine to take additional and/or increasingly strong thermal mitigation actions as the confidence level for a thermal status prediction of abnormal thermal pressure increases.

In some instances, the wireless device may additionally or alternatively determine one or more wireless device subsystems associated with the predicted thermal status of the wireless device, and possibly select one or more thermal mitigation actions to perform based at least in part on the wireless device subsystem(s) associated with the predicted thermal status of the wireless device. For example, in some instances, when the predicted thermal status changes from normal thermal pressure to abnormal thermal pressure, the wireless device may determine that one or more wireless device subsystems associated with the change from normal thermal pressure to abnormal thermal pressure, for example based on which of the parameters (and which wireless device subsystems they are associated with) have changed in conjunction with the change in predicted thermal status. In other words, the wireless device may attempt to determine if the activities of certain subsystems in particular are responsible for a significant increase in thermal pressure, which may facilitate the wireless device's ability to perform targeted thermal mitigation action.

For example, if one or more wireless device subsystems are determined to be associated with (e.g., to bear significant responsibility for) the thermal status of the wireless device being abnormal thermal pressure, the wireless device may select one or more thermal mitigation actions that affect the subsystem(s) determined to be (at least partially) responsible for the thermal status of the wireless device being abnormal thermal pressure. Thus, if a baseband subsystem is determined to be associated with the wireless device having abnormal thermal pressure, the thermal mitigation action(s) could include actions targeted at the baseband subsystem, for example including any or all of switching at least some wireless communication performed by the wireless device from cellular communication to Wi-Fi communication; reducing an uplink transmission duty cycle of the wireless device; reducing an uplink transmission power of the wireless device; reducing a number of multiple-input-multiple-output (MIMO) layers used to perform wireless communication by the wireless device; reducing a number of component carriers used to perform wireless communication by the wireless device; or reducing a number of antenna components used to perform wireless communication by the wireless device, among various other possibilities. As another example, if an application subsystem is determined to be associated with the wireless device having abnormal thermal pressure, the thermal mitigation action(s) could include actions targeted at the application subsystem, for example including reducing background application activity, and/or any of various other possible actions.

Thus, the method of FIG. 5 may be used to predict and mitigate thermal pressure in a wireless device. At least according to some embodiments, such techniques may help reduce device power consumption; reduce or avoid unpredictable device behavior, component shutdowns and damage due to thermal buildup; improve user comfort levels; and/or otherwise improve user experience, at least in some instances.

FIGS. 6-12 and Additional Information

FIGS. 6-12 illustrate further aspects that might be used in conjunction with the method of FIG. 5 if desired. It should be noted, however, that the exemplary details illustrated in and described with respect to FIGS. 6-12 are not intended to be limiting to the disclosure as a whole: numerous variations and alternatives to the details provided herein below are possible and should be considered within the scope of the disclosure.

Electronic devices, including wireless devices, may commonly be at least somewhat sensitive to operating temperatures. This sensitivity may be due to certain components that could potentially act unpredictably or cease to function when operated outside of a specified temperature range, or that could suffer damage when operated outside of a specified temperature range. As another (e.g., additional or alternative) possibility, some devices may be designed for use in contact with the skin of their user (e.g., smart watch, smart glasses, other wearable devices, etc.), in which case it may be desirable to maintain an operating temperature that is within user comfort range.

One possible approach to managing the operating temperature of a wireless device may include a passive approach, e.g., in which the wireless device monitors the temperature of the wireless device using one or more temperature sensors (possibly at multiple locations within the device) to detect when the temperature rises above a certain threshold. When this occurs, (e.g., when the device is already at a high temperature), the device may react and take thermal mitigation actions (e.g., reducing/restraining certain radio activities at baseband, and/or performing any of various other possible actions to potentially reduce operating temperature). At least in some instances, such an approach (e.g., including the thermal mitigation actions) may be performed in a manner that is agnostic to that activities occurring at the wireless device.

Figure 6:
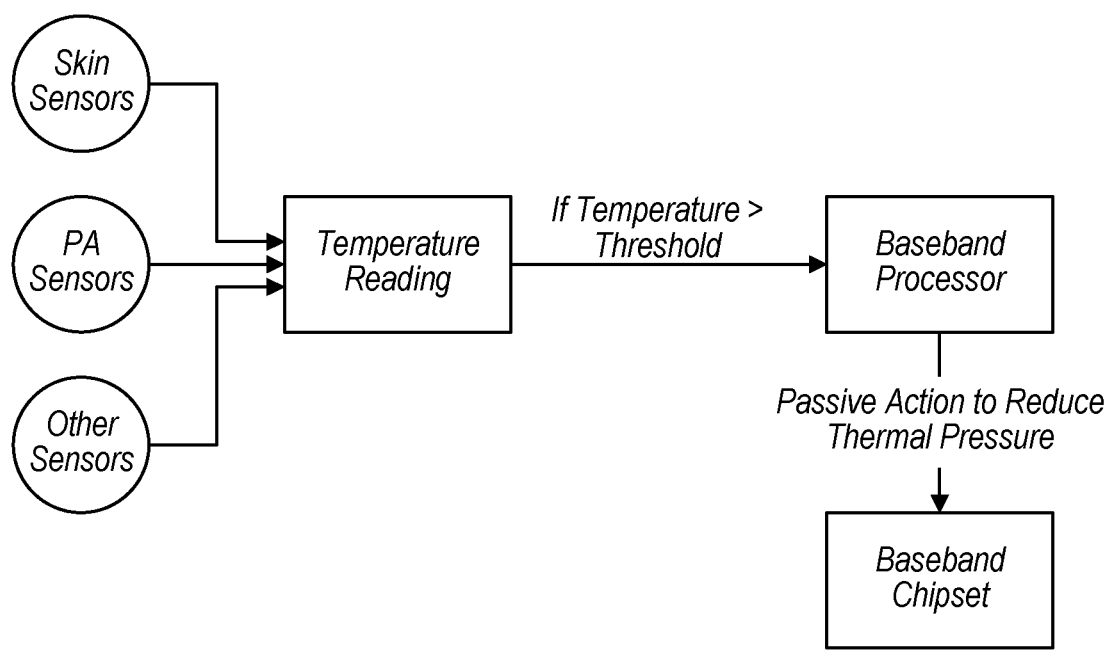
FIG. 6 illustrates aspects of a possible example approach to detecting and reacting to the thermal status of a wireless device, according to some embodiments.

FIG. 6 illustrates exemplary aspects of one such possible passive approach, according to some embodiments. As shown, in the illustrated example, temperature readings for a wireless device may be taken using various temperature sensors for the wireless device (e.g., one or more temperature sensors for detecting the temperature of the wireless device at a location where user skin contact might be expected, one or more temperature sensors for detecting temperature at one or more power amplifiers of the wireless device, and/or any of various other sensors). If these temperature readings indicate that the temperature of the wireless device exceeds a certain temperature threshold, an indication may be provided to a baseband processor (and/or other subsystems) of the wireless device, which may in turn modify baseband chipset activity (and/or other subsystem activity) to attempt to reduce thermal pressure.

Another possible approach to managing the operating temperature of a wireless device may include a proactive approach, e.g., in which the wireless device can potentially predict when thermal pressure is likely to occur, and proactively take thermal mitigation action to potentially avoid the device operating temperature from reaching undesirable levels. For example, it may be possible to correlate network activity, application usage, and device status parameters with thermal status to prescreen conditions likely to result in high temperatures being reached, and to take early thermal mitigation action as a preventative measure before those high temperatures are actually reached. Note that such an approach may be used to supplement a passive thermal detection and mitigation approach, or may be used as an alternative approach, according to various embodiments.

Figure 7:
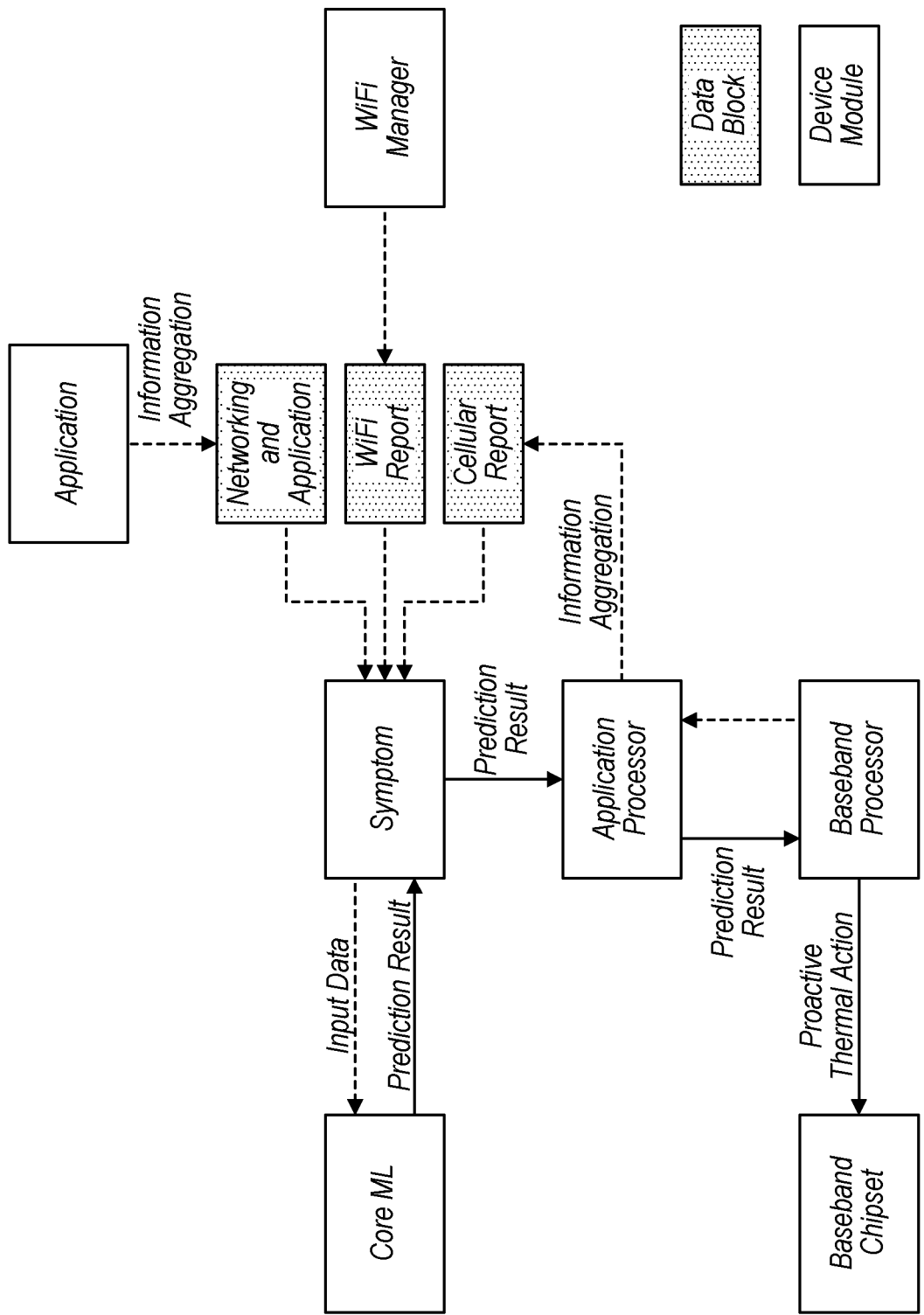
FIGS. 7-10 illustrate aspects of possible example approaches to predicting the thermal status of a wireless device and taking proactive action based on the predicted thermal status, according to some embodiments.

FIG. 7 illustrates exemplary aspects of one such possible proactive approach, according to some embodiments. As shown, in the illustrated example, various information, such as values for a number of parameters indicative of various aspects of network activity, application usage, wireless communication technology characteristics, device characteristics, and/or other features, may be aggregated and input to a machine learning (ML) algorithm configured to predict a thermal pressure level for the wireless device based on the various inputs. The ML function may provide the prediction result, and depending on the prediction result (e.g., if high thermal pressure is predicted), the wireless device may take proactive thermal mitigation action. The thermal mitigation action may include modifying baseband chipset activity to attempt to reduce thermal pressure (e.g., as shown), and/or any of various other possible thermal mitigation actions.

Figure 8:
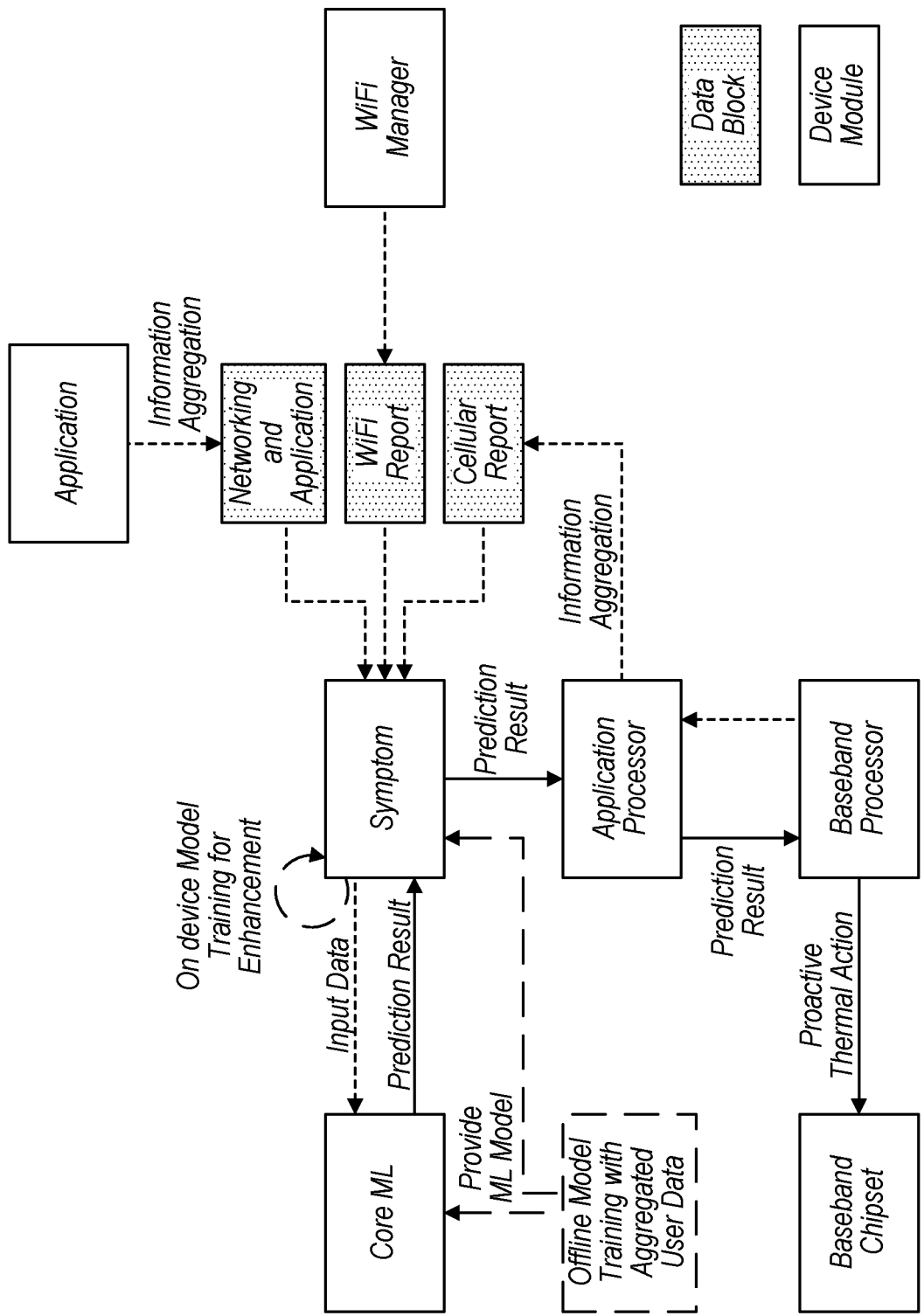

FIG. 8 illustrates further possible aspects of the approach illustrated in FIG. 7. In particular, as illustrated, in order to configure the ML function, offline model training may be performed, for example using aggregated (e.g., anonymized) data for other (e.g., similar) wireless devices, and possibly also using data for the wireless device. In addition, if desired, the wireless device may be configured to perform on-device model training, e.g., to enhance the ML algorithm in a device-specific manner, e.g., using data for the wireless device. This may help enhance the accuracy of the predictions provided by the ML function.

Figure 9:
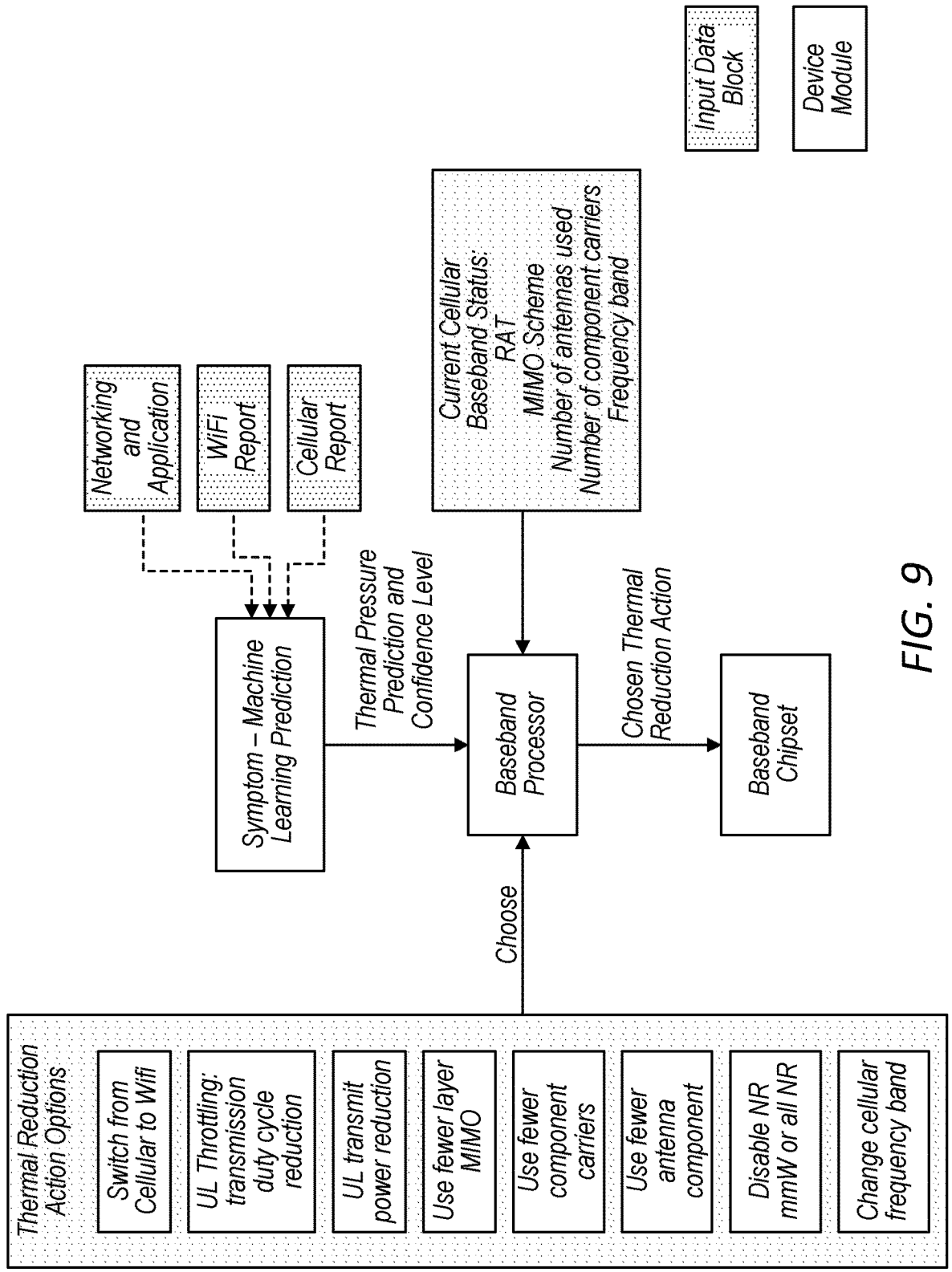

FIG. 9 illustrates further exemplary aspects of how proactive thermal mitigation action could be performed based on such a proactive approach to temperature management in a wireless device, according to some embodiments. As shown, the baseband processor of a wireless device that receives an indication of a thermal pressure prediction and confidence level may take into account the current cellular baseband status, for example including the current radio access technology (RAT), MIMO scheme, number of antennas used, number of component carriers, frequency band, and/or any of various other aspects of the current cellular baseband status, and a set of possible thermal reduction action options that are available (e.g., possibly based on the current cellular baseband status), such as switching at least some data communication from cellular to Wi-Fi, performing uplink throttling (e.g., reducing transmission duty cycle), reducing uplink transmit power, using fewer MIMO layers, using fewer component carriers, using fewer antenna components, disabling NR mmW or all NR communication, changing cellular frequency band, and/or any of various other possible actions. Given the current cellular baseband status and the set of possible thermal reduction action options, the baseband processor may select one or more thermal reduction actions, which may be performed by the baseband chipset. Note that in some instances, the mitigation action(s) may further be selected based on confidence level of the thermal pressure prediction (e.g., in the case of a binary classification algorithm), or on which thermal pressure class (e.g., light, moderate, or heavy) is predicted (e.g., in the case of a multi-class prediction algorithm).

According to some embodiments, it may be possible that thermal mitigation actions may be selected based on the thermal status prediction confidence level, and also based on a device type of the wireless device. For example, in some instances, different thermal mitigation actions may be taken, at different prediction confidence levels, for different types of wireless devices, e.g., based on different device types having different capabilities (and thus potentially different sets of thermal mitigation actions) and/or having different user experience impacts from operating outside of its normal temperature range. For example, user experience may be more sensitive to operating temperature for a wearable device (such as a smart watch, smart glasses, etc.) that may commonly be worn in contact with the skin of a user than for a wireless device that less commonly comes in contact with the skin of a user.

As an example, according to one possible scenario, a smart phone could be configured to take no thermal reduction action at an abnormal thermal pressure prediction confidence level of 65% while on E-UTRAN New Radio—Dual Connectivity (ENDC) using a millimeter wave (mmW) band, to limit mmW component carriers to one at an abnormal thermal pressure prediction confidence level of 75% while on ENDC using a mmW band, to release a secondary cell group (SCG) and limit uplink duty cycle to 40% at an abnormal thermal pressure prediction confidence level of 90% while on ENDC using a mmW band, to limit the wireless device to a maximum of 2 receive antennas and up to 2 layer MIMO at an abnormal thermal pressure prediction confidence level of 85% while on LTE with 4 antennas used and 4 layer MIMO configured, and to switch from cellular to Wi-Fi at an abnormal thermal pressure prediction confidence level of 90% while on LTE in a stationary state with a low link quality metric value and a large file transfer ongoing. Note that these examples of various possible thermal mitigation activities at various abnormal thermal pressure prediction confidence levels for various cellular baseband statuses should not be considered limiting, and that any number of other configurations or variations on these configurations are also possible.

As another example, according to another possible scenario, a smart watch could be configured to take no thermal reduction action at an abnormal thermal pressure prediction confidence level of 55% while on a cellular connection, to limit uplink duty cycle to 80% at an abnormal thermal pressure prediction confidence level of 60% while on a cellular connection, to limit uplink transmit power to 80% and duty cycle to 50% at an abnormal thermal pressure prediction confidence level of 80% while on a cellular connection, to switch to cellular to magnet mode or Wi-Fi at an abnormal thermal pressure prediction confidence level of 90% while on a cellular connection, and to halt selected background applications at an abnormal thermal pressure prediction confidence level of 90% while already on Wi-Fi. Note that these examples of various possible thermal mitigation activities at various abnormal thermal pressure prediction confidence levels for various cellular baseband statuses should similarly not be considered limiting, and that any number of other configurations or variations on these configurations are also possible.

After a successful thermal mitigation action by a wireless device, it may be the case that the wireless device adjusts its machine learning model prediction based on the real-time observed characteristics, which may in turn reduce the thermal pressure prediction confidence level below the thermal mitigation action threshold.

Use of such prescreening for potential abnormal thermal conditions and early preventative action, e.g., in addition to abnormal thermal condition detection and mitigation based on direct temperature measurements, may provide improved user experience for a wireless device, at least in some instances. For example, taking earlier action may allow for thermal mitigation to occur using more gentle and/or gradual mitigation actions, which may result in reduced impact on user experience. Taking earlier action may also result in potential battery use reduction. Further, such an approach may support cause analysis, e.g., to better understand causes of thermal issues. Such contextual awareness can further facilitate more targeted thermal mitigation actions, e.g., which may reduce or avoid the impact of those thermal mitigation actions on subsystems that are more remote from the cause of the thermal issues. For example, in some instances, it may be possible to reduce or avoid taking unnecessary baseband thermal mitigation actions when thermal issues are determined to not be caused by baseband operations, e.g., instead targeting some background activity if that is determined to be a primary reason for thermal risk.

Figure 10:
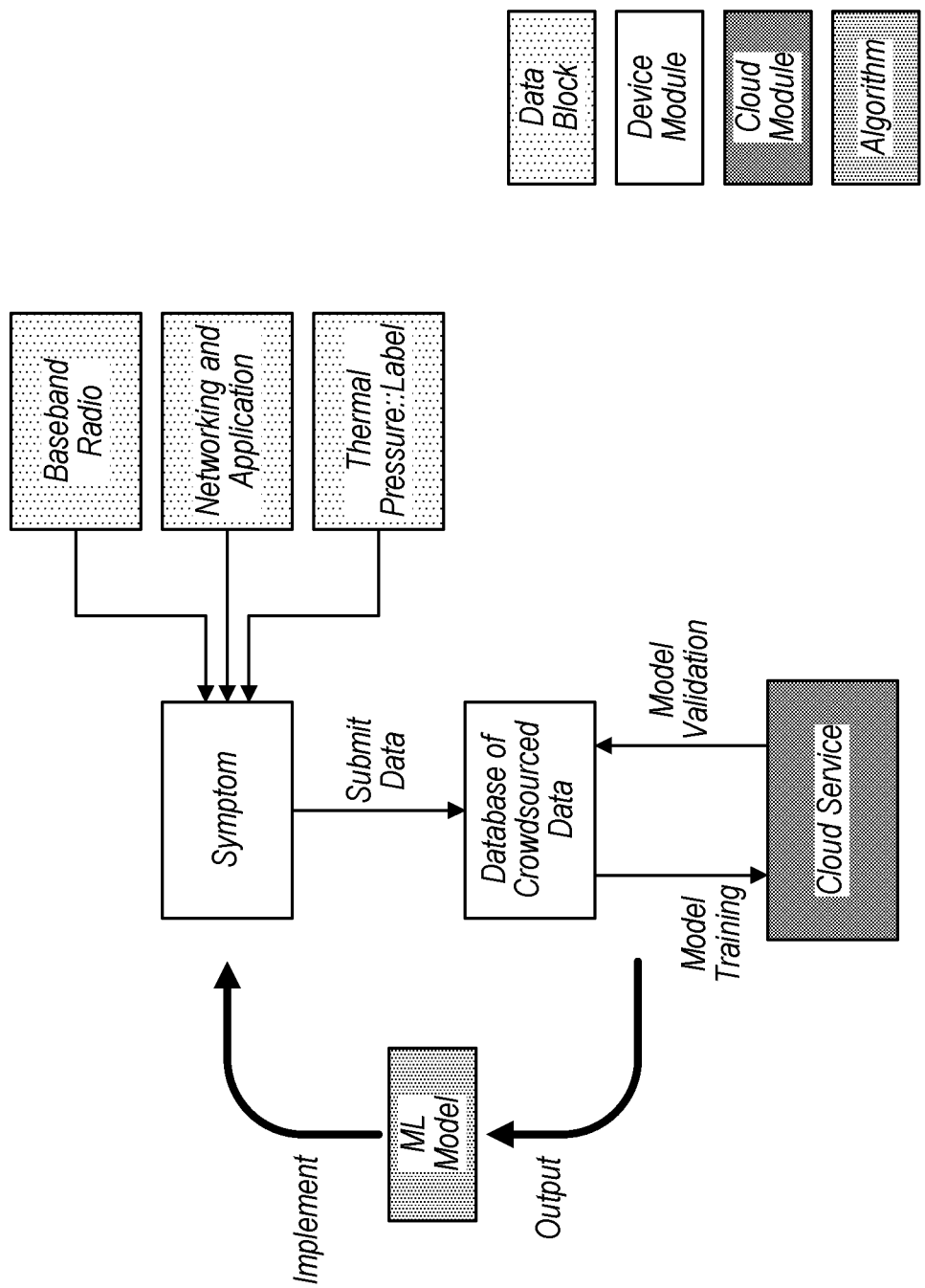

As previously noted, in some instances the thermal status prediction performed by a wireless device may make use of a machine learning model. FIG. 10 illustrates further aspects of how such a model could be trained and implemented by a wireless device. As shown, a wireless device may submit data from its thermal status prediction function to a database of crowdsourced data. The data submitted may include data samples for the wireless device, for example where each data sample includes some or all of: values for the various parameters used for a thermal status prediction; the thermal status prediction; and an actual thermal status associated with the thermal status prediction. A cloud service may perform model training and validation using the database of crowdsourced data to generate a machine learning classification model, which may in turn be provided to the wireless device. Such a process may be repeated to refine the machine learning classification model over time, e.g., using new/additional crowdsourced data accumulated over time. Additionally, as previously noted herein, on-device training for device-wise fine tuning may be implemented, if desired. Note that any of various machine learning model parameters (e.g., for a decision tree based machine learning model: number of trees, depth, classification threshold, learning rate, etc.) and validation parameters (e.g., number of cross validation folds) may be used for the training and validation, as desired.

The features used to perform the thermal status prediction may include any of a variety of features, which may relate to network activity, application activity, baseband activity, device characteristics, and/or any of various other features. Such possible features could include any or all of cellular link quality metrics, 'cellular known good' (e.g., based on historical data, whether a specific cell that the wireless device is attached to has good or bad performance), cellular radio technology, cellular band, cellular bandwidth, cellular bars (e.g., signal strength), Wi-Fi link quality metrics, Wi-Fi band, 'Wi-Fi known good' (e.g., based on historical data, whether a specific Wi-Fi network that the wireless device is associated with has good or bad performance), Wi-Fi radio technology, GPS band, battery percentage, battery capacity (e.g., any or all of current battery capacity, maximum battery capacity, design battery capacity, absolute battery capacity), battery voltage, estimated battery time remaining, whether battery is connected to external power, whether battery is fully charged, whether battery is charging, whether battery is at a 'warning' level, whether battery is at a 'critical' level, whether the wireless device is plugged in, whether the wireless device screen is on, screen brightness level (e.g., percentage of a maximum), CPU utilization level (e.g., percentage of a maximum), ambient temperature (e.g., the temperature of the surroundings of the wireless device), an application domain or name, an application activity label, an application active duration length, a completion reason for an application completing an activity, whether TCP fast open is configured, whether TCP fast open is in use, a connected interface type for a connected interface, any of various application activity features such as an 'interior activity' feature, a 'root activity' feature, or a 'leaf activity' feature, a current carrier or cellular network associated with the wireless device, a device type or product type of the wireless device, a number of SIMs of the wireless device, a motion state of the wireless device, and/or any of various other possible features. Note that different features may have different importance levels, and further that the relative importance of different features may be different for different wireless device types, at least according to some embodiments.

Figure 11:
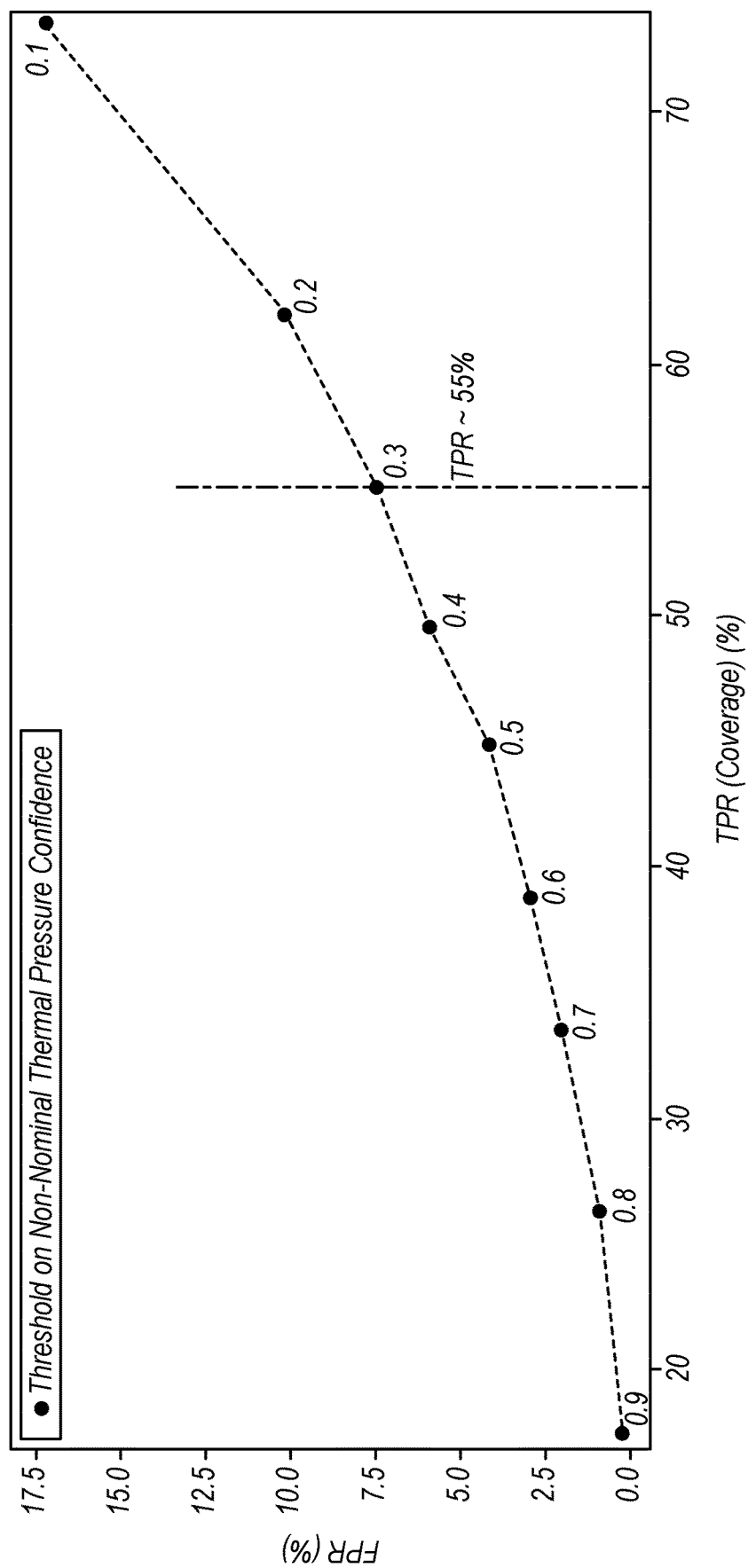
FIG. 11 is a graph illustrating false positive rate and true positive rate for abnormal thermal pressure predictions, using various confidence thresholds for the predictions, in a possible example scenario, according to some embodiments.

Although it should be noted that any of a variety of possible machine learning models may be used in conjunction with the techniques described herein, as one specific example, a gradient boosted decision tree could be used as a possible binary classifier. FIG. 11 illustrates the false positive rate (FPR) versus the true positive rate (TPR) for different thresholds on non-nominal thermal pressure confidence for such an example classifier when trained using one possible example data set. As shown, in the illustrated example, it may be possible to reduce the false positive rate (at a cost of a lower true positive rate) by increasing the classification threshold on non-nominal thermal pressure confidence (or conversely by reducing the classification threshold on nominal thermal pressure confidence), or alternatively to increase the true positive rate (at a cost of a higher false positive rate) by reducing the classification threshold on non-nominal thermal pressure confidence (or conversely by increasing the classification threshold on nominal thermal pressure confidence). For example, by reducing the classification threshold on nominal thermal pressure confidence in the illustrated example scenario from 0.5 to 0.48, it may be possible to reduce the FPR by 0.5% while suffering a 1.6% reduction in TPR. Thus, it may be possible to adjust the classification threshold depending on the relative importance of reducing FPR (e.g., to avoid triggering unnecessary thermal mitigation action) versus the importance of increasing TPR (e.g., to increase the ability of the wireless device to take effective preventative thermal mitigation actions.

FIG. 12 illustrates examples of various low and high thermal pressure predictions, at various confidence levels, that could result from the use of a thermal pressure classification algorithm such as the binary classifier of FIG. 11, based on selected varying feature values. As shown, in the first example 1202, a low thermal stress, high confidence prediction may result when deviceScreenOn is TRUE, batteryIsCharging is FALSE, batteryExternalPowerIsConnected is FALSE, devicePluggedIn is FALSE, activity depth is 1, activityDomain is Web, cellularBandInfo is Null, and CellularLQM is 100. In the second example 1204, a low thermal stress, mid confidence prediction may result when deviceScreenOn is TRUE, batteryIsCharging is TRUE, batteryExternalPowerIsConnected is TRUE, devicePluggedIn is TRUE, activity depth is 1, activityDomain is Web, cellularBandInfo is 12, and CellularLQM is 100. In the third example 1206, a high thermal stress, high confidence prediction may result when deviceScreenOn is TRUE, batteryIsCharging is FALSE, batteryExternalPowerIsConnected is FALSE, devicePluggedIn is FALSE, activity depth is 5, activityDomain is Media, cellularBandInfo is 41, and CellularLQM is 100.

In some instances, it may be useful to apply one or more techniques to further adjust the characteristics of the thermal pressure classification algorithm. For example, if a significant class imbalance exists among data samples, such as if the number of data samples for normal or nominal thermal pressure significantly outnumbers the number of data samples for abnormal or non-nominal thermal pressure, it may be useful to use one or more of resampling (e.g., downsampling majority class or upsampling minority class, e.g., using nearest neighbors to create synthetic samples), class weights, and/or cost sensitive learning techniques (e.g., Log-reg Objective, Huber Loss, Fair Objective, Log cosh, Hinge Loss, Weighted Cross-Entropy Loss, etc.) to address such a class imbalance.

In the following further exemplary embodiments are provided.

One set of embodiments may include an apparatus, comprising: a processor configured to cause a wireless device to: receive status information for a plurality of parameters for the wireless device; and determine a predicted thermal status for the wireless device based at least in part on the status information for the plurality of parameters for the wireless device.

According to some embodiments, the plurality of parameters include one or more network activity status parameters, one or more battery status parameters, one or more wireless communication status parameters, and one or more user context status parameters.

According to some embodiments, the predicted thermal status is selected from normal thermal pressure or abnormal thermal pressure, wherein when the predicted thermal status is abnormal thermal pressure, the processor is further configured to cause the wireless device to: identify a wireless device subsystem associated with the predicted thermal status being abnormal thermal pressure; and determine one or more thermal mitigation actions to implement based at least in part in response to the predicted thermal status for the wireless device and the identified wireless device subsystem.

According to some embodiments, the processor is further configured to cause the wireless device to: determine a confidence level for the predicted thermal status for the wireless device, wherein the one or more thermal mitigation actions to implement are determined further based at least in part in response to the confidence level for the predicted thermal status for the wireless device.

According to some embodiments, the processor is further configured to cause the wireless device to: determine one or more wireless device subsystems associated with the predicted thermal status being abnormal thermal pressure, wherein the one or more thermal mitigation actions to implement are determined further based at least in part on the one or more wireless device subsystems associated with the predicted thermal status being abnormal thermal pressure.

According to some embodiments, the predicted thermal status is determined using a decision tree based machine learning classification algorithm.

Another set of embodiments may include a wireless device, comprising: an antenna; a radio operably coupled to the antenna; and a processor operably coupled to the radio; wherein the wireless device is configured to: receive status information for a plurality of parameters for the wireless device; and determine a predicted thermal status for the wireless device based at least in part on the status information for the plurality of parameters for the wireless device; and perform at least one thermal mitigation action based at least in part on the predicted thermal status.

According to some embodiments, the wireless device is further configured to: determine that the predicted thermal status for the wireless device has changed from normal thermal pressure to abnormal thermal pressure based at least in part on the status information for the plurality of parameters for the wireless device; and determine a wireless device subsystem associated with the change from normal thermal pressure to abnormal thermal pressure, wherein the at least one thermal mitigation action is selected based at least in part on the wireless device subsystem associated with the change from normal thermal pressure to abnormal thermal pressure.

According to some embodiments, the at least one thermal mitigation action includes one or more of: switching at least some wireless communication performed by the wireless device from cellular communication to Wi-Fi communication; reducing an uplink transmission duty cycle of the wireless device; reducing an uplink transmission power of the wireless device; reducing a number of multiple-input-multiple-output (MIMO) layers used to perform wireless communication by the wireless device; reducing a number of component carriers used to perform wireless communication by the wireless device; selecting a different frequency band on which to perform cellular communication; enabling or disabling use of millimeter wave 3GPP NR communication; or reducing a number of antenna components used to perform wireless communication by the wireless device.

According to some embodiments, the plurality of parameters include one or more network activity status parameters, one or more battery status parameters, one or more wireless communication status parameters, and one or more user context status parameters.

According to some embodiments, the wireless device is further configured to: determine a confidence level for the predicted thermal status for the wireless device, wherein the at least one thermal mitigation action is selected further based at least in part on the confidence level for the predicted thermal status for the wireless device.

According to some embodiments, the predicted thermal status is determined by the wireless device using a machine learning classification algorithm, wherein the wireless device is further configured to: perform training of the machine learning classification algorithm using data samples for previous status information for the plurality of parameters and associated thermal status outcomes for the wireless device.

According to some embodiments, the predicted thermal status is determined by the wireless device using a machine learning classification algorithm, wherein the wireless device is further configured to: receive machine learning classification model information for the machine learning classification algorithm from a second device.

According to some embodiments, the wireless device is further configured to: provide data samples for previous status information for the plurality of parameters and associated thermal status outcomes for the wireless device to a second device.

Yet another set of embodiments may include a method, comprising: by a wireless device: receiving machine learning classification model information for a thermal pressure classification algorithm from a cloud server, wherein the thermal pressure classification algorithm determines a thermal pressure level of the wireless device based on a plurality of parameters of the wireless device; determining values for the plurality of parameters of the wireless device; determining the thermal pressure level of the wireless device using the thermal pressure classification algorithm; determining whether to perform thermal mitigation action based at least in part on the thermal pressure classification of the wireless device; and selecting one or more thermal mitigation actions to perform when it is determined to perform thermal mitigation action.

According to some embodiments, the thermal pressure classification algorithm is a binary classification algorithm configured to classify the thermal pressure of the wireless device as normal thermal pressure or abnormal thermal pressure, wherein the method further comprises: determining a confidence level for the thermal pressure classification for the wireless device, wherein determining whether to perform thermal mitigation action is further based at least in part on the confidence level for the thermal pressure classification for the wireless device.

According to some embodiments, the thermal pressure classification algorithm is a multi-class prediction algorithm configured to classify the thermal pressure of the wireless device as one of at least three thermal pressure classes.

According to some embodiments, the plurality of parameters of the wireless device include parameters associated with a plurality of subsystems of the wireless device, wherein when it is determined to perform thermal mitigation action, the method further comprises: determining one or more subsystems of the wireless device to perform targeted thermal mitigation action.

According to some embodiments, the method further comprises: providing data samples for previous parameter values and associated thermal status outcomes for the wireless device to the cloud server, wherein the machine learning classification model information is determined based at least in part on data samples for parameter values and associated thermal status outcomes for the wireless device and for a plurality of other wireless devices.

According to some embodiments, the plurality of parameters include at least three of: a type of application activity active at the wireless device; a reason for network activity completion for a network activity of the wireless device; a wireless device type of the wireless device; a motion state of the wireless device; whether a battery of the wireless device is connected to an external power source; whether the battery of the wireless device is currently charging; a battery capacity of the wireless device; whether a screen of the wireless device is currently on; a cellular radio access technology in use by the wireless device; a cellular link quality metric parameter for a cellular link in use by the wireless device; a cellular band in use by the wireless device; a cellular bandwidth in use by the wireless device; a Wi-Fi technology in use by the wireless device; or a Wi-Fi link quality metric parameter for a Wi-Fi link in use by the wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
  determine status information for a plurality of parameters for the wireless device; and
  determine, based at least in part on the status information for the plurality of parameters for the wireless device, a predicted thermal pressure for the wireless device, wherein the predicted thermal pressure is selected from normal thermal pressure or abnormal thermal pressure, wherein when the predicted thermal pressure is abnormal thermal pressure, the processor is further configured to cause the wireless device to:
    identify a wireless device subsystem associated with the predicted thermal pressure; and
    implement one or more thermal mitigation actions based at least in part in response to the predicted thermal pressure for the wireless device and the identified wireless device subsystem.

2. The apparatus of claim 1,
wherein the plurality of parameters includes one or more network activity status parameters, one or more battery status parameters, one or more wireless communication status parameters, and one or more user context status parameters.

3. The apparatus of claim 1, wherein the processor is further configured to cause the wireless device to:
determine a confidence level for the predicted thermal pressure for the wireless device,
wherein the one or more thermal mitigation actions to implement are determined further based at least in part in response to the confidence level for the predicted thermal status for the wireless device.

4. The apparatus of claim 1, wherein the processor is further configured to cause the wireless device to:
determine one or more wireless device subsystems associated with the predicted thermal pressure being abnormal thermal pressure,
wherein the one or more thermal mitigation actions to implement are determined further based at least in part on the one or more wireless device subsystems associated with the predicted thermal pressure being abnormal thermal pressure.

5. The apparatus of claim 1,
wherein the predicted thermal pressure is determined using a decision tree based machine learning classification algorithm.

6. A wireless device, comprising:
an antenna;
a radio operably coupled to the antenna; and
a processor operably coupled to the radio;
wherein the wireless device is configured to:
determine status information for a plurality of parameters for the wireless device; and
determine, based at least in part on the status information for the plurality of parameters for the wireless device, a predicted thermal pressure for the wireless device, wherein the predicted thermal pressure is selected from normal thermal pressure or abnormal thermal pressure, wherein when the predicted thermal pressure is abnormal thermal pressure, the processor is further configured to cause the wireless device to:
identify a wireless device subsystem associated with the predicted thermal pressure; and
implement one or more thermal mitigation actions based at least in part in response to the predicted thermal pressure for the wireless device and the identified wireless device subsystem.

7. The wireless device of claim 6, wherein the wireless device is further configured to:
determine that the predicted thermal pressure for the wireless device has changed from normal thermal pressure to abnormal thermal pressure based at least in part on the status information for the plurality of parameters for the wireless device; and
determine a wireless device subsystem associated with the change from normal thermal pressure to abnormal thermal pressure,
wherein the at least one thermal mitigation action is selected based at least in part on the wireless device subsystem associated with the change from normal thermal pressure to abnormal thermal pressure.

8. The wireless device of claim 7, wherein the one or more thermal mitigation actions include one or more of:
switching at least some wireless communication performed by the wireless device from cellular communication to Wi-Fi communication;
reducing an uplink transmission duty cycle of the wireless device;
reducing an uplink transmission power of the wireless device;
reducing a number of multiple-input-multiple-output (MIMO) layers used to perform wireless communication by the wireless device;
reducing a number of component carriers used to perform wireless communication by the wireless device;
selecting a different frequency band on which to perform cellular communication;
enabling or disabling use of millimeter wave 3GPP NR communication; or
reducing a number of antenna components used to perform wireless communication by the wireless device.

9. The wireless device of claim 7, wherein the wireless device is further configured to:
determine a confidence level for the predicted thermal pressure for the wireless device, wherein the at least one thermal mitigation action is selected further based at least in part on the confidence level for the predicted thermal pressure for the wireless device.

10. The wireless device of claim 6,
wherein the plurality of parameters includes one or more network activity status parameters, one or more battery status parameters, one or more wireless communication status parameters, and one or more user context status parameters.

11. The wireless device of claim 6, wherein the predicted thermal pressure is determined by the wireless device using a machine learning classification algorithm, wherein the wireless device is further configured to:
perform training of the machine learning classification algorithm using data samples for previous status information for the plurality of parameters and associated thermal status outcomes for the wireless device.

12. The wireless device of claim 6, wherein the predicted thermal pressure is determined by the wireless device using a machine learning classification algorithm, wherein the wireless device is further configured to:
receive machine learning classification model information for the machine learning classification algorithm from a second device.

13. The wireless device of claim 6, wherein the wireless device is further configured to:
provide data samples from previous status information for the plurality of parameters and associated thermal status outcomes for the wireless device to a second device.

14. A method, comprising:
by a user equipment (UE):
determining status information for a plurality of parameters for the UE; and
determining, based at least in part on the status information for the plurality of parameters for the UE, a predicted thermal pressure for the UE, wherein the predicted thermal pressure is selected from normal thermal pressure or abnormal thermal pressure, wherein when the predicted thermal pressure is abnormal thermal pressure, the method further comprises:
identifying a subsystem of the UE associated with the predicted thermal pressure; and
implementing one or more thermal mitigation actions based at least in part in response to the predicted thermal pressure for the UE and the identified subsystem of the UE.

15. The method of claim 14, further comprising:
receiving machine learning classification model information for a thermal pressure classification algorithm from a cloud server, wherein the thermal pressure classification algorithm determines a thermal pressure level of the wireless device based on the plurality of parameters of the UE;

determining values for the plurality of parameters of the UE;

determining the thermal pressure level of the UE using the thermal pressure classification algorithm;

determining whether to perform thermal mitigation action based at least in part on the thermal pressure classification of the UE; and selecting one or more thermal mitigation actions to perform when it is determined to perform thermal mitigation action.

16. The method of claim 15, wherein the method further comprises:

determining a confidence level for the thermal pressure classification for the UE, wherein determining whether to perform thermal mitigation action is further based at least in part on the confidence level for the thermal pressure classification for the UE.

17. The method of claim 15, wherein the thermal pressure classification algorithm is a multi-class prediction algorithm configured to classify the thermal pressure of the UE as one of at least three thermal pressure classes.

18. The method of claim 15, wherein the plurality of parameters of the UE includes parameters associated with a plurality of subsystems of the UE, wherein when it is determined to perform thermal mitigation action, wherein the method further comprises:

determining one or more subsystems of the wireless device to perform targeted thermal mitigation action.

19. The method of claim 15, further comprising:

providing data samples for previous parameter values and associated thermal status outcomes for the UE to the cloud server, wherein the machine learning classification model information is determined based at least in part on data samples for parameter values and associated thermal status outcomes for the UE and for a plurality of other UEs.

20. The method of claim 15, wherein the one or more thermal mitigation actions include one or more of:

switching at least some wireless communication performed by the UE from cellular communication to Wi-Fi communication;

reducing an uplink transmission duty cycle of the UE;

reducing an uplink transmission power of the UE;

reducing a number of multiple-input-multiple-output (MIMO) layers used to perform wireless communication by the UE;

reducing a number of component carriers used to perform wireless communication by the UE;

selecting a different frequency band on which to perform cellular communication;

enabling or disabling use of millimeter wave 3GPP NR communication; or reducing a number of antenna components used to perform wireless communication by the UE.

* * * * *